(12) United States Patent
Poola et al.

(10) Patent No.: US 8,391,798 B2
(45) Date of Patent: Mar. 5, 2013

(54) APPARATUS, METHOD, AND MANUFACTURE FOR MANAGING SCALABLE AND TRACEABLE EXCHANGES OF CONTENT BETWEEN ADVERTISERS AND PUBLISHERS FOR MOBILE DEVICES

(75) Inventors: Krishna Leela Poola, Bangalore (IN); Kalyan Kumar Kanuri, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 994 days.

(21) Appl. No.: 12/211,730

(22) Filed: Sep. 16, 2008

(65) Prior Publication Data
US 2010/0069096 A1    Mar. 18, 2010

(51) Int. Cl.
*H04B 1/00* (2006.01)

(52) U.S. Cl. ............ 455/67.11; 455/466; 455/512; 455/66.1; 455/67.14

(58) Field of Classification Search .................. None
See application file for complete search history.

(56) References Cited

U.S. PATENT DOCUMENTS

| 6,134,532 | A | 10/2000 | Lazarus et al. | |
| 7,050,818 | B2 | 5/2006 | Tendler | |
| 7,930,214 | B2 * | 4/2011 | Knauerhase et al. | 705/26.1 |
| 7,953,416 | B2 * | 5/2011 | Gonen et al. | 455/445 |
| 2002/0184302 | A1 | 12/2002 | Prueitt et al. | |
| 2004/0044565 | A1 | 3/2004 | Kumar et al. | |
| 2005/0175165 | A1 | 8/2005 | Holder | |
| 2007/0016573 | A1 | 1/2007 | Nanavati et al. | |
| 2007/0064895 | A1 * | 3/2007 | Wong et al. | 379/142.09 |
| 2008/0070593 | A1 | 3/2008 | Altman et al. | |
| 2009/0285378 | A1 * | 11/2009 | Poola et al. | 379/201.11 |

FOREIGN PATENT DOCUMENTS

| KR | 1020050053153 A | 6/2005 |
| KR | 1020060072778 | 6/2006 |

OTHER PUBLICATIONS

U.S. Appl. No. 12/121,445.
International Search Report and Written Opinion for International Application No. PCT/US2009/054698 mailed Mar. 18, 2010.
International Preliminary Report on Patentability for International Patent Application No. PCT/US2009/054698 mailed Mar. 22, 2011.

* cited by examiner

*Primary Examiner* — Olumide T Ajibade Akonai
*Assistant Examiner* — Randy Peaches
(74) *Attorney, Agent, or Firm* — Frommer Lawrence & Haug LLP; John W. Branch

(57) ABSTRACT

A service exchange is provided. The service exchange receives text messages (such as SMS messages), such as search queries sent by a user to the service exchange, or a text message sent from the user to another user. The service exchange determines service providers most relevant to the user, and provides the information related to the most relevant service providers to the user, including, for each relevant service provider provided to the user, a dynamically assigned, obfuscated phone number for contacting the service provider.

17 Claims, 11 Drawing Sheets

(Registration from Provider)

(Registration continued)

APPARATUS, METHOD, AND MANUFACTURE FOR MANAGING SCALABLE AND TRACEABLE EXCHANGES OF CONTENT BETWEEN ADVERTISERS AND PUBLISHERS FOR MOBILE DEVICES

FIELD OF THE INVENTION

The present invention relates generally to communicating messages over a network, and in particular but not exclusively, to an apparatus, method, and manufacture for providing service provider information for a service relevant to content of a text message, such as a short message service (SMS) message.

BACKGROUND OF THE INVENTION

The use of mobile technologies is steadily on the increase, for both business and personal uses. Mobile phones are a common site today and many people own personal information management (PIM) devices, palmtop computers, and so forth, to manage their schedules, contacts, and to stay connected with friends, family, and work. Employees on the move often appreciate the value of staying connected with their business through their mobile devices. With such a variety of mobile devices, one can receive email messages, Instant Messaging (IM) messages, and Short Message Service (SMS) text messages, in addition to regular voice calls. Recently, the use of SMS and other forms of text messaging has become very popular. Users often send text messages to each other via their mobile devices.

BRIEF DESCRIPTION OF THE DRAWINGS

Non-limiting and non-exhaustive embodiments of the present invention are described with reference to the following drawings, in which.

DETAILED DESCRIPTION

Figure 1:
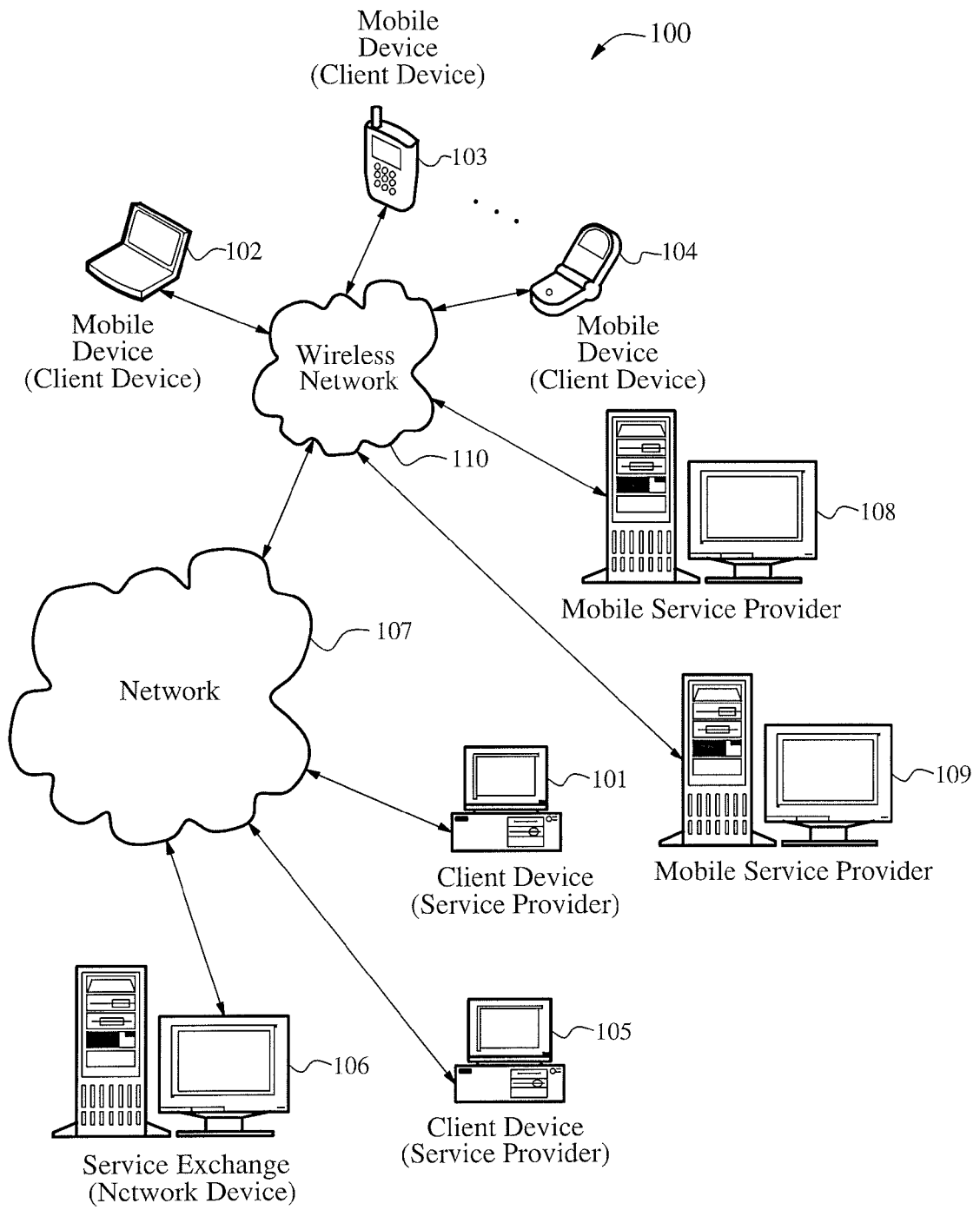
FIG. 1 shows a block diagram of an embodiment of a system for communicating over a network.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. As used herein, the term "or" is an inclusive "or" operator, and is equivalent to the term "and/or," unless the context clearly dictates otherwise. The term "based, in part, on", "based, at least in part, on", or "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the invention is related to a service exchange that receives text messages (such as SMS messages), such as search queries sent by a user to the service exchange, or a text message sent from the user to another user. The service exchange determines service providers most relevant to the user, and provides the information related to the most relevant service providers to the user, including, for each relevant service provider provided to the user, a dynamically assigned, obfuscated phone number for contacting the service provider.

Illustrative Operating Environment

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes network 107, wireless network 110, network device (service exchange) 106, mobile devices (client devices) 102-104, client devices (service providers) 101 and 105, mobile service provider 108, and mobile service provider 109. In some embodiments, the client devices for the service provider such as client device 101 and client device 105 may be a mobile device such as mobile devices 102-104.

One embodiment of client devices 101-105 is described in more detail below in conjunction with FIG. 2. Generally, however, mobile devices 102-104 may include virtually any portable computing device capable of receiving and sending a message over a network, such as network 107, wireless network 110, or the like. One or more of mobiles devices 102-104 may be used a client device for the service provider, in addition to or instead of client device 101 and/or 105. A service provider provides goods and/or services such as travel, shopping, medical, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 102-104 also may include at least one other client application that is configured to receive content from another computing device. The client application may include a capability to provide and receive textual content, graphical content, audio content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an electronic serial number (ESN), or other mobile device identifier. The information may also indicate a content format that the mobile device is enabled to employ. Such information may be provided in a message, or the like, sent to service exchange 106, client device 101, or other computing devices. Moreover, mobile devices 102-104 may further provide information associated with its physical location to another computing device.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as service exchange 106, another of the mobile device 102-104, or the like.

Mobile devices 102-104 may be further configured to enable a user to participate in communications sessions, such as IM sessions. As such, mobile devices 102-104 may include a client application that is configured to manage various actions on behalf of the client device. For example, the client application may enable a user to interact with the browser application, email application, IM applications, SMS application, and the like.

Client device 101 and client device 105 may each include virtually any computing device capable of communicating over a network to send and receive information. The set of such devices may include devices that typically connect using a wired or wireless communications medium such as personal computers, multiprocessor systems, microprocessor-based or programmable consumer electronics, network PCs, or the like.

Wireless network 110 is configured to couple mobile devices 102-104 and its components with network 107. Wireless network 110 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless network 110 may further include an autonomous system of terminals, gateways, routers, and the like connected by wireless radio links, and the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless network 110 may enable a radio connection through a radio network access such as Global System for Mobil communication (GSM), General Packet Radio Services (GPRS), Enhanced Data GSM Environment (EDGE), Wideband Code Division Multiple Access (WCDMA), and the like. In essence, wireless network 110 may include virtually any wireless communication mechanism by which information may travel between mobile devices 102-104 and another computing device, network, and the like. Mobile service provider 108 and mobile service provider 109 provide cellular networks for mobile devices. Mobile service providers include companies such as T-Mobile, AT&T, or the like.

Network 107 is configured to couple service exchange 106 and its components with other computing devices, including, mobile devices 102-104, client device 101, client device 105, and through wireless network 110 to mobile devices 102-104. Network 107 is enabled to employ any form of computer readable media for communicating information from one electronic device to another. Also, network 107 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 107 includes any communication method by which information may travel between service exchange 106, and other computing devices.

Additionally, communication media typically embodies computer-readable instructions, data structures, program modules, or other data in a modulated data signal such as a carrier wave, data signal, or other transport mechanism and includes any information delivery media. The terms "propagated signal", "modulated data signal", and "carrier-wave signal" each include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Although FIG. 1 illustrates service exchange 106 as a single computing device, the invention is not so limited. For example, one or more functions of service exchange 106 may be distributed across one or more distinct computing devices.

In one embodiment, service exchange 106 receives SMS messages from one or more mobile devices, such as mobile device 103. In one embodiment, service changes 106 receives only messages sent from the mobile device to service exchange 106, such as a search query in an SMS message sent by mobile device 103 to service exchange 106. In other embodiments, service exchange 106 receives SMS messages sent from one mobile device to another, such as from mobile device 103 to mobile device 104. In either case, in some embodiments, service exchange 106 determines, based on the SMS messages, service providers (e.g. service providers 101 and 105) most relevant to the user (of mobile device 103), and provides the information related to the most relevant service provider to the user, including, for each relevant service provider provided to the user, a dynamically assigned, obfuscated phone number for contacting the service provider.

Illustrative Client Device

Figure 2:
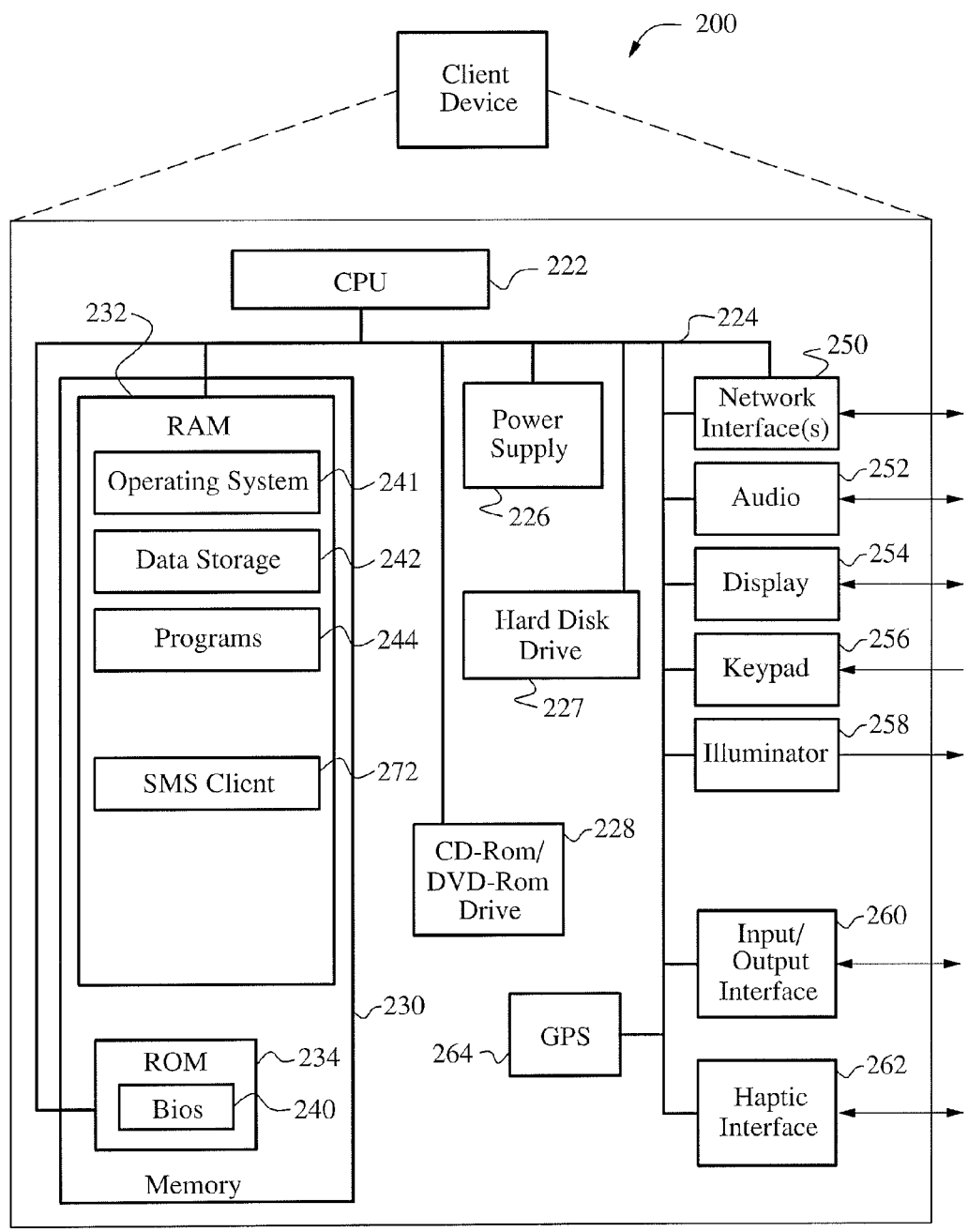
FIG. 2 illustrates a block diagram of one embodiment of a client device that may be included in a system implementing an embodiment of the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. As shown in the figure, client device 200 includes a processing unit 222 in communication with a mass memory 230 via a bus 224.

One embodiment of client device 200 also includes a power supply 226, one or more network interfaces 250, an audio interface 252, a display 254, a keypad 256, an illuminator 258, an input/output interface 260, a haptic interface 262, and a global positioning systems (GPS) receiver 264. However, various embodiment of client device 200 may include more or less components than illustrated in FIG. 2. Power supply 226 provides power to client device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP (Session Initiated Protocol), RTP (Real-Time Transport Protocol), UMTS (Universal Mobile Telecommunications System), and the like.

Audio interface 252 may be arranged to produce and receive audio signals such as the sound of a human voice, music, or the like. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Client device 200 may further include additional mass storage facilities such as CD-ROM/DVD-ROM drive 228 and hard disk drive 227. Hard disk drive 227 is utilized by client device 200 to store, among other things, application programs, databases, and the like. Additionally, CD-ROM/DVD-ROM drive 228 and hard disk drive 227 may store audio data, or the like.

Keypad 256 may comprise any input device arranged to receive input from a user (e.g. a sender). For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, and the like. Haptic interface 262 may be arranged to provide tactile feedback to a user (e.g. a sender) of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS and the like, to further determine the physical location of client device 200 on the surface of the Earth. It is understood that under different conditions, GPS transceiver 264 can determine a physical location within millimeters for client device 200; and in other cases, the determined physical location may be less precise, such as within a meter or significantly greater distances.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of client device 200. The mass memory also stores an operating system 241 for controlling the operation of client device 200. It will be appreciated that this component may include a general purpose operating system such as a version of UNIX, or LINUX™, or a specialized client communication operating system such as Windows Mobile™, or the Symbian® operating system. The operating system may include an interface with a Java virtual machine module that enables control of hardware components and/or operating system operations via Java application programs.

In one embodiment, operating system 241 may include specialized digital audio mixing, analog audio mixing, and/or audio playing software. Operating system 241 may provide this software through functional interfaces, APIs, or the like. In one embodiment, digital audio mixing may include generating a new playable data that is based on a plurality of playable data input, where the new data may represent a superposition of the audio signals associated with the plurality of playable data input. Digital audio mixing may be enabled by operating system 241 through an API, such as Windows Driver Media (WDM) mixing APIs and/or digital mixing software libraries, such as Windows' DirectSound, FMOD, Miles Sound System, Open Sound System (OSS), SDL Mixer, CAM (CPU's audio mixer), or the like. In one embodiment, stereophonic (stereo) audio data may be converted into mono-audio data to be played over a mono-audio device, or the like. Similarly, analog audio mixing may be enabled by APIs to convert digital data into an analog signal (e.g. modulation), add and/or filter several analog signals, and re-convert the analog signal into digital data. In one embodiment, the addition and/or filtering may be performed by a summing amplifier.

Memory 230 further includes one or more data storage 242, which can be utilized by client device 200 to store, among other things, programs 244 and/or other data. For example, data storage 242 may also be employed to store information that describes various capabilities of client device 200. The information may then be provided to another device based on any of a variety of events, including being sent as part of a header during a communication, sent upon request, and the like.

In one embodiment, programs 244 may include specialized audio mixing and/or playing software. Programs 244 may provide this software through functional interfaces, APIs, or the like. Programs 244 may also include computer executable instructions which, when executed by client device 200, transmit, receive, and/or otherwise process messages (e.g., SMS, MMS, IM, email, and/or other messages), audio, video, and enable telecommunication with another user of another client device. Other examples of application programs include calendars, contact managers, task managers, transcoders, database programs, word processing programs, spreadsheet programs, games, CODEC programs, and so forth. Client device 200 may also be configured to receive a message from another computing device, employing another mechanism, including, but not limited to email, Short Message Service (SMS), Multimedia Message Service (MMS), internet relay chat (IRC), mIRC, and the like. In addition, mass memory 230 may store programs such as SMS client 272.

Illustrative Network Device

Figure 3:
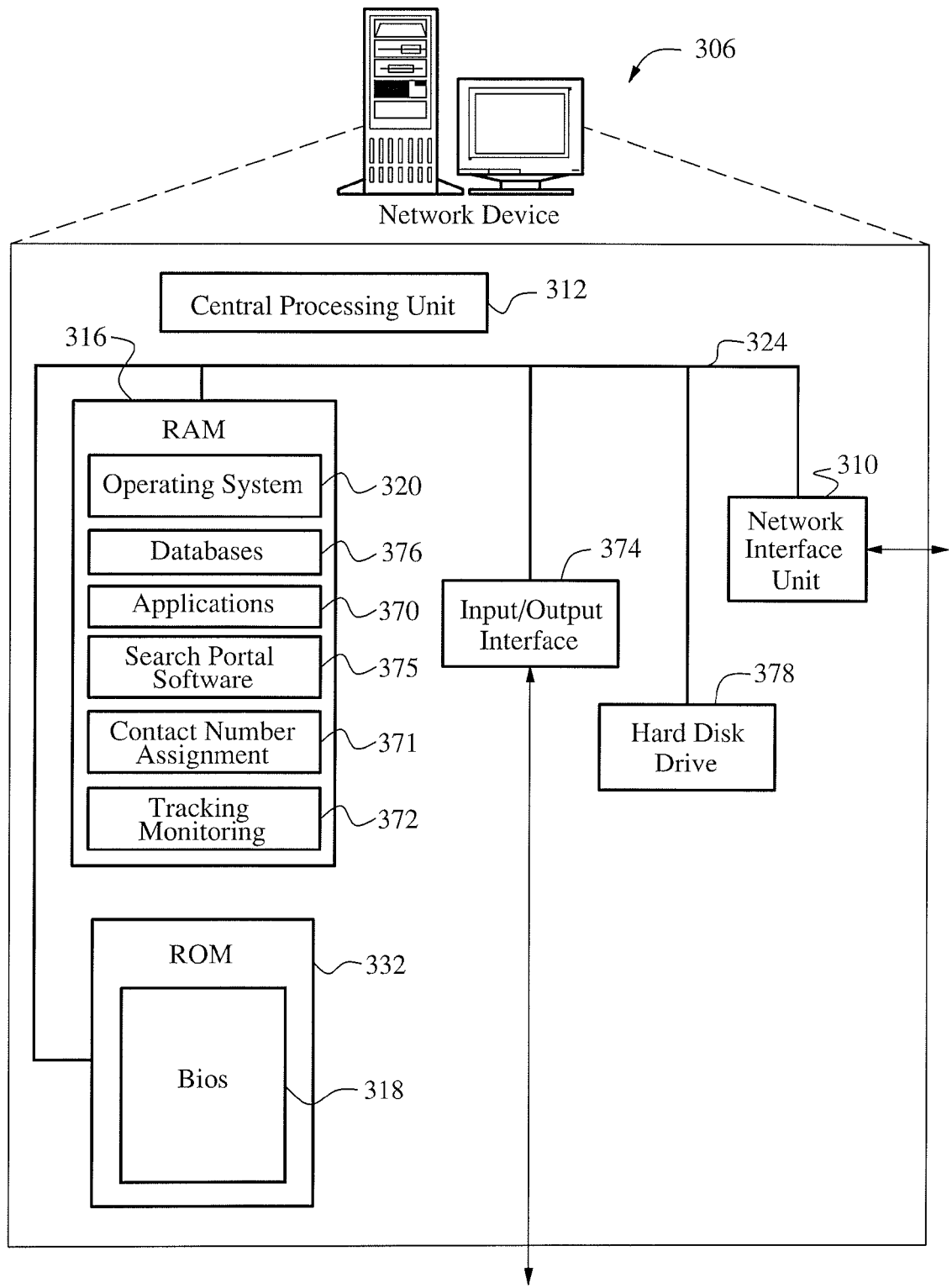
FIG. 3 shows a block diagram of one embodiment of a network device that may be included in a system implementing an embodiment of the invention.

FIG. 3 shows one embodiment of network device 300, according to one embodiment of the invention. Network device 300 may be employed as an embodiment of network device 106 of FIG. 1, and/or the like. Network device 300 may include many more components than those shown. The components shown, however, are sufficient to disclose an illustrative embodiment for practicing the invention.

Network device 300 includes processing unit 312, and a mass memory, all in communication with each other via bus 322. The mass memory generally includes RAM 316, ROM 332, and one or more permanent mass storage devices, such as hard disk drive 378, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, such as network 107 in FIG. 1, via network interface unit 310, which is constructed for use with various communication protocols including the TCP/IP protocol. Network interface unit 310 is sometimes known as a transceiver, transceiving device, network interface card (NIC), and the like.

Network device 300 also includes input/output interface 374 for communicating with external devices, such as a mouse, keyboard, scanner, or other input devices not shown in FIG. 3. Likewise, network device 300 may further include additional mass storage facilities such as a CD-ROM/DVD-ROM drive and hard disk drive 378. Hard disk drive 378 is utilized by network device 300 to store, among other things, application programs, databases, and the like.

The mass memory as described above illustrates another type of computer-readable media, namely computer storage media. Computer storage media may include volatile, non-volatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 370 are loaded into mass memory and run on operating system 320. Examples of application programs include email programs, schedulers, calendars, transcoders, database programs, word processing programs, spreadsheet programs, and so forth. The mass memory may include databases 376, search portal software 375, contact number assignment engine 371, and tracking monitoring engine 372. The applications including search portal software 375, contact number assignment engine 371, and tracking monitoring engine 372 may be realized as software (executable) code on a computer-readable storage medium and executed on a computing device. Databases 376 may include a numbers database, a service provider index database, and/or the like.

Search portal software 376 may include software for processing registration information from service providers, and for responding to text messages (such as SMS messages, in one embodiment) received from users. Further, search portal software 376 may generate text messages in response to the text messages from users by determining service providers relevant to content in the text message, and providing a list of one or more of the relevant service providers in the text message, including, for each relevant service provider, an obfuscated, dynamically-assigned contact number.

Description of One Illustrative Embodiment of a System

Figure 4:
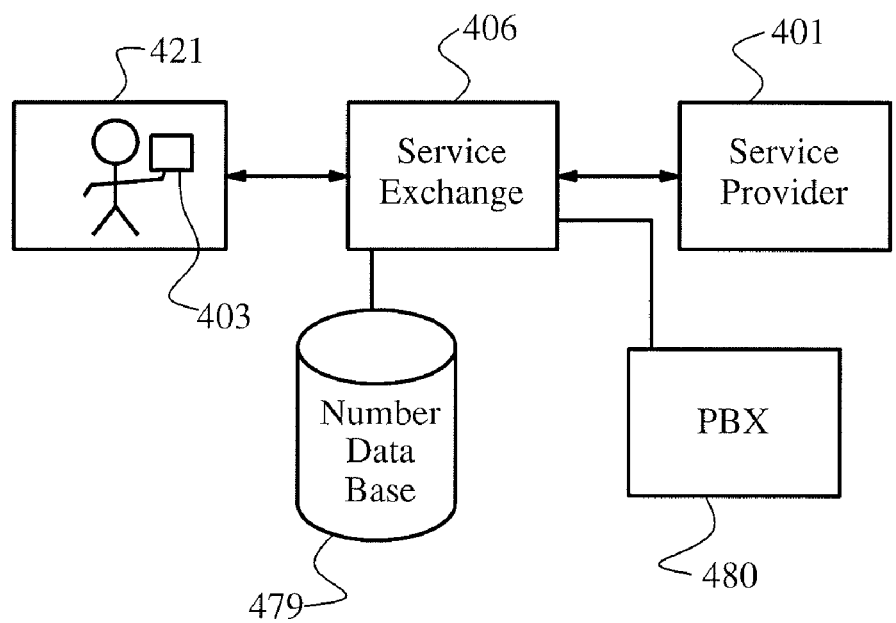
FIG. 4 illustrates a block diagram of an embodiment of a portion of the system of FIG. 1.

FIG. 4 illustrates a functional block diagram an embodiment of system 411, which may be employed as an embodiment of system 100 of FIG. 1. System 411 may include user 421, mobile device 403 of user 421, service exchange 406, number database 479, service provider 401, and private branch exchange (PBX) 480. FIG. 4 illustrates the scenario where the user 421 makes a search request to service exchange 406. However, as previously discussed, various embodiments of the invention may also involve message sent from one user to another user.

Service providers 401 register with service exchange 406. Also, user 421 may send a request to service exchange 406 via mobile device 403, for example by sending an messaging service message (such as an SMS, MMS, or IM) to service exchange 406. In one embodiment, service exchange 406 is arranged to determine a service based on the messaging service message, and to rank service providers relevant to the service, where the ranking may also include factors such as the user 421 and the current location of user 421. Service exchange 406 determines one or more top ranked services to provide to user 421. In one embodiment, the top 2 or 3 ranked service providers may be provided. For each service provider that is to be provided to user 421, a contact number is dynamically assigned. Service exchange 406 provides the top ranked service providers to user 421 (e.g., via an SMS message sent to mobile device 403), along with information about each top ranked service provider, including the contact number.

The user and service provider do not directly contact each other. Rather, all contacts are carried out using dynamically assigned, time-limited obfuscated contact numbers, as detailed below. The mapping between the actual telephone numbers and the dynamic contact number is stored on database 479, along with other data relevant to the transaction between user 421 and service provider 401. In one embodiment, service exchange 406 facilitates a transaction between parties by assigning the dynamic contact number, setting an expiration time for the contact number, and tracking the exchange between the parties.

A pool of available contact numbers is maintained in database 479. When a contact number is assigned, a selected number from the pool is assigned to the user. This number (dynamic contact number or obfuscated number) may be selected at random, or may be selected using another allocation strategy depending on privacy requirements. For example, one such intelligent allocation strategy could be not to assign the same dynamic number assigned to the particular user in the previous N allocations.

Assignment of the dynamic contact number may be implemented with an existing telephone network using a private branch exchange (PBX) 480. A PBX manages a pool of phone numbers where the first few digits will be common but the last few digits vary. The number of varying digits will depend on number of available connections; typically this number is 4, which means that 10,000 unique numbers can be assigned from a PBX.

In one embodiment, each assigned dynamic contact number is tagged with a time limit, after which the contact expires (that is, the number is no longer usable for a transaction between user 421 and service provider 401). The lifetime of the contact number may depend on several factors, as described in further detail below. Expiration of the number may be "soft" (some extension of time permitted) or "hard" (no extension of time permitted), depending on the history and context of the transaction.

The parties (e.g. user 421 and service provider 401) communicate using the dynamic contact numbers. Accordingly, all conversations between the parties go through a service provider channel maintained by service exchange 406. Service exchange 406 may track the exchange between the parties, and extracts business data therefrom. While it is not necessary to track most of the conversations between the parties, service providers 401 would find it desirable to track details such as the time and place of the user's contact, whether the deal was successful, and so fort. For example, a service exchange 406 connecting service providers 401 and users/customers 421 would want to know the status of the deal in order to charge the service provider an appropriate commission.

In an embodiment, a call from the user 421 directed to a service provider 411 will be either forwarded or proxied, depending on privacy settings established when the customer is assigned the dynamic contact number. In the case of call forwarding, service exchange 406 will not perform a tracking function. In the case of proxying, the conversations of a party are routed through the service exchange 406 so that service exchange 406 acts as a voice proxy. Once the conversation is finished, service exchange 406 may perform tracking by taking input from a user 421 about the success of the transaction with DTMF key inputs (e.g. prompting the user to "press 1 for a successful transaction").

In some embodiments, the contact numbers are dynamically assigned, given a limited lifetime, and then recycled (made available for reassignment to a different user).

Service exchange 406 allows service providers 401 and customers 421 to interact with each other in a seamless fashion and in the process generating revenue for mobile search engines and advertising firms via a scalable and traceable exchange accomplished by service exchange 406. Service exchange 406 provides opportunity for advertising models like Cost Per Click (CPC), Cost Per Action (CPA), and/or the like. With scalability, the business can be expanded with some set of customers and service providers. Traceability allows fitting better pricing models to ensure better revenues. Tracking becomes feasible as the dynamic contact numbers assigned to both the service provider and customer can be tracked. Depending on the advertising model of the service provider, a commission by service exchange 421 to service provider 401.

Service providers 401 provide the services which customers 421 would be interested in. Service providers 401 are the businesses that pay for the appropriate commission to service exchange 406. A service provider 401 registers with a service exchange 406 either by herself or upon request by the service exchange 406 with an appropriate advertising model suiting the business of the service provider. For example, if a travel agent registers for travel related services with cost per conversion as the advertising model, the travel agent pays a commission to service exchange 406 upon every conversion.

In one embodiment, customers 421 enroll for services with the service exchange 401 with the details of the service. Exchanges provide them with the information for the requested services. In the travel agent example, if a customer subscribes for a travel agent at a particular location, exchange will provide her with all the details of the travel agents around the customer's locality. By minimizing the efforts required from customers, a customer-friendly business is enabled.

Service exchanges 406 enables seamless business between service providers 401 and customers 421 and in the process generating revenues based on the advertising models accepted by the service providers 401. In one embodiment, service exchange 406 tracks the communication between the provider 401 and customer 421 for precise billing/accounting.

Service providers are first registered in order to be eligible as a search result. In registration, service providers identify themselves by
1. Name & Capabilities
2. Contact Address (importantly city & locality)
3. Contact phone no Capabilities are the list of services the provider can provide. For example, if it is a travel company, service provider can provide kind of tours & list of cities they operate on as tags.

These are matched with keywords that customers would be interested in.

The service provider can add more tags at a later point of time as well. Precise contact address including street address & house number could be provided so that longitude & latitude can be located in a better fashion, thus providing more accurate details to the customer. In some embodiments, these details are validated manually with the help of contact number so that better results are provided to customers.

In some embodiments, customers enroll for information with the service providers. As customer information such as the location, gender etc. are easily available, a service exchange does not require many details for serving a customer. A customer can alert the service exchange with the need at hand and it is the service exchange which helps the customer by providing the necessary information of the service provider.

Between user 421 and business service provider 401, a transparent call is established between these two parties via the service exchange 406. Service exchange 406 may be realized via companies or providers that enable the transferring of data or content over any type of network. These companies or providers may include Yahoo!, or another web service provider, or all other types of data service providers engaging in the transfer of information. The service exchange 406 may provide obfuscation, proxying, monitoring, etc. upon acting as a hub between the user 421 and the business service provider 401. The service exchange 406 interacts with the business service provider 401 and the user 421 via network(s).

Illustrative Process for Service Provider Registration

Figure 5:
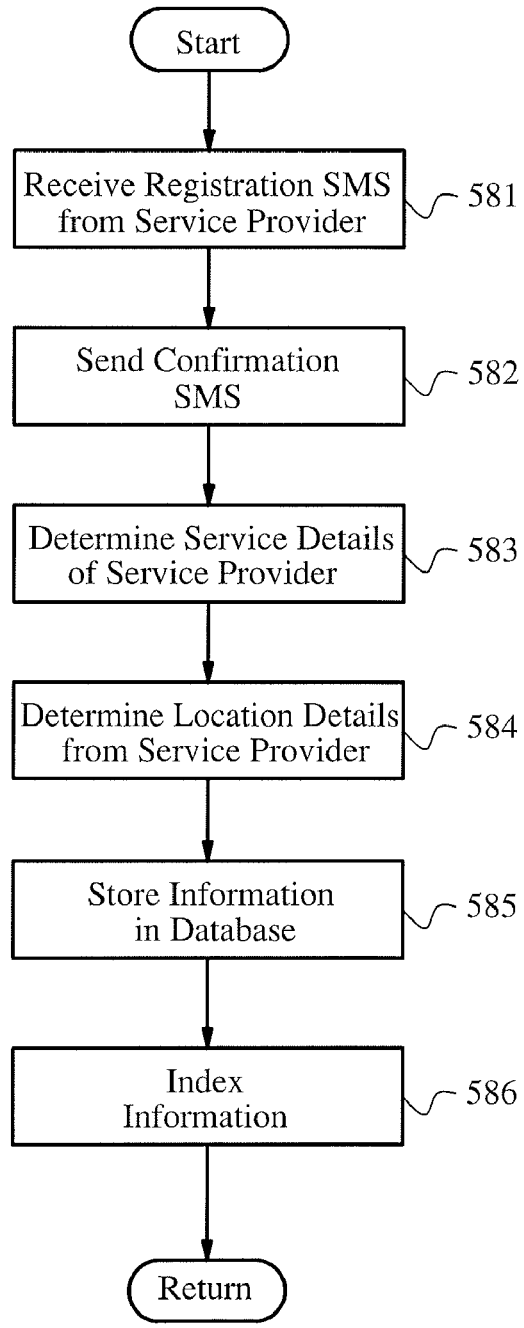
FIG. 5 illustrates flow chart of an embodiment of a process for service provider registration.

FIG. 5 illustrates an embodiment of process 500, which may be employed by an embodiment of service exchange 106 of FIG. 1. Process 500 only shows one particular process of registration, in which registration is accomplished via SMS. However, registration may be accomplished in many other ways, such as the service provider calling the service exchange and having the service change enter the information provided in the telephone call into the database, or the like.

Figure 6:
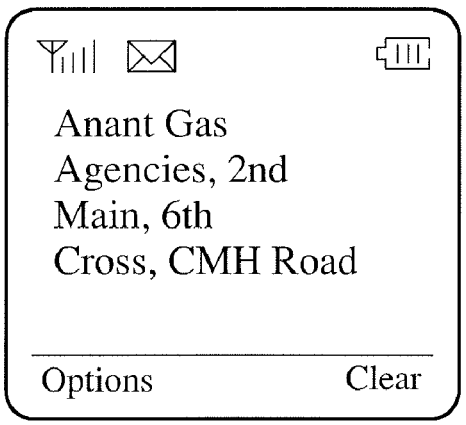
FIG. 6 shows an embodiment of an SMS message for service provider registration.
Figure 6:
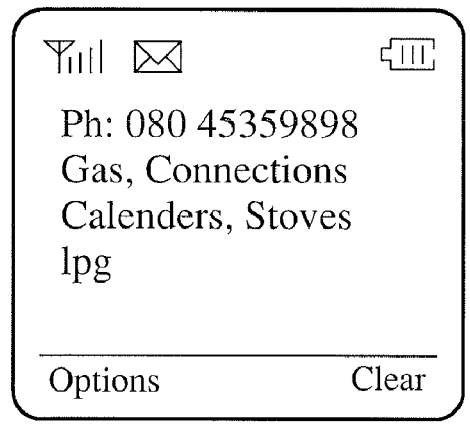

After a start block, the process proceeds to block 581, where a registration SMS from a service provider is received. One example of such a registration SMS is illustrated in FIG. 6. The process then advances to block 582, where a confirmation SMS is sent to the service provider. The process then moves to block 583, where service details of the service provider are determined. For example, the service details for the SMS shows in FIG. 6 are: gas, connections, calendars, and stoves. In some embodiments, the SMS is required to be in a specific format, in which the service details ate determined based on their being in their proper location based on the required format. In other embodiments, no specific format is required, and the service information is determined based on information retrieval, natural language processing, machine learning algorithms, or other similar techniques. If the confidence in the result is not high, the correct service information can be determined via a follow-up, either by automated follow-up, or follow-up by a human operator to clarify the correct service information.

The process then proceeds to block 584, where location details from the service provider are determined. The process then advances to block 585, where the information regarding the service provider is stored in a database. The process then moves to block 586, where the service provider information is indexed. The process then proceeds to a return block, where other processing is resumed.

Illustrative Process for Provided Search Results to User

Figure 7:
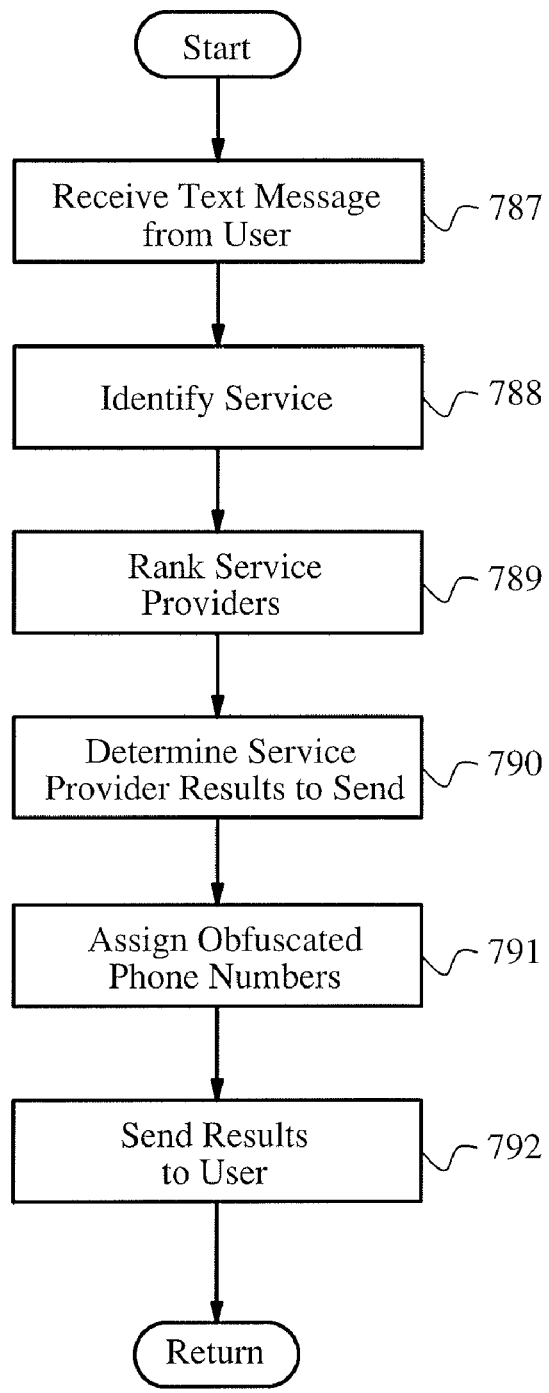
FIG. 7 illustrates a flow chart of an embodiment of a process.

FIG. 7 illustrates an embodiment of process 700, which may be employed by an embodiment of service exchange 106 of FIG. 1.

Figure 8:
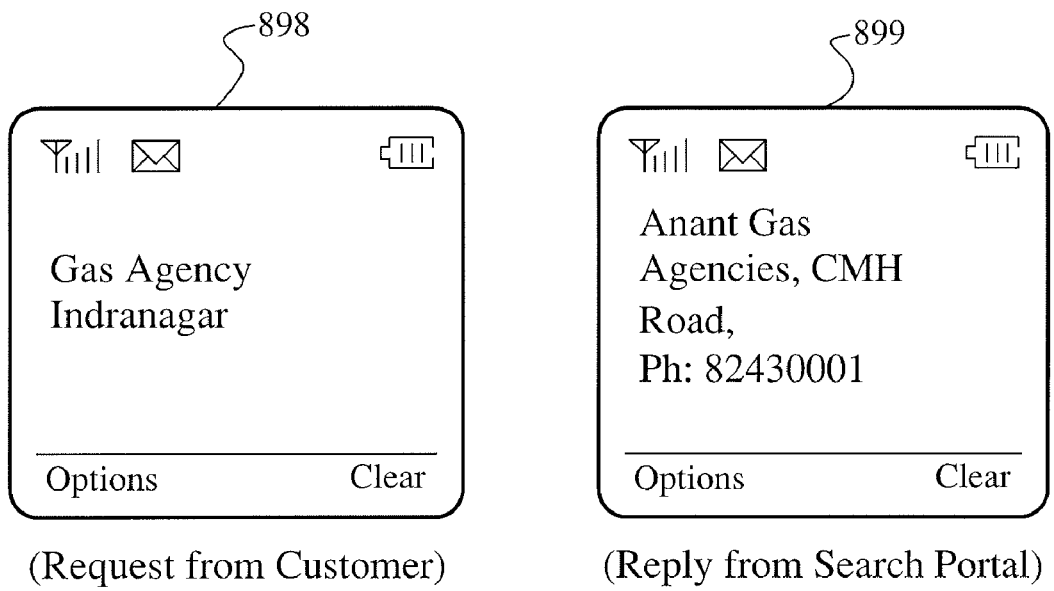
FIG. 8 shows an embodiment of an SMS message of a search query.

After a start block, the process proceeds to block 787, where a text message is received from a user. In some embodiments, the text message may be an SMS message, MMS message, IM message, or the like. One example of such an SMS message is shown in FIG. 8 as SMS message 898. The messaging service message may be a messaging service message sent from a user to the service exchange in order to find a service provider. Alternatively, in some embodiments, the messaging service message may be a messaging service message sent from one user to another user.

The process then advances to block 788, where a service relevant to context of the text message is identified. For example, in SMS message 898, "gas agency" would be identified as the service. The process then moves to block 789, where service providers associated with the identified service are ranked for the user. One or more top results of the search are provided to the user. In some embodiments, the top two or three results are provided to the user. The process then advances to block 791, where an obfuscated phone number is dynamically assigned for each service provider to be sent to the user for the user to contact the service provider. The process then proceeds to block 792, where the results are provided to the user. For each service provider provided to the user, at least some information about the service provided is provided, including the obfuscated contact number. In some embodiments, the results are provided to the user via SMS. One example of such an SMS sent to the user is illustrated in FIG. 8 as SMS message 899. In SMS message 899, an obfuscated contact number, 82430001, is provided in message.

In one embodiment, in some contexts, in addition to providing an obfuscating contact number to the user for contacting the service provider, a separate obfuscated contact number is also dynamically assigned and provided to the service provider for contacting the user.

Embodiment of a Process for Providing Search Results to User and Tracking

Figure 9A:
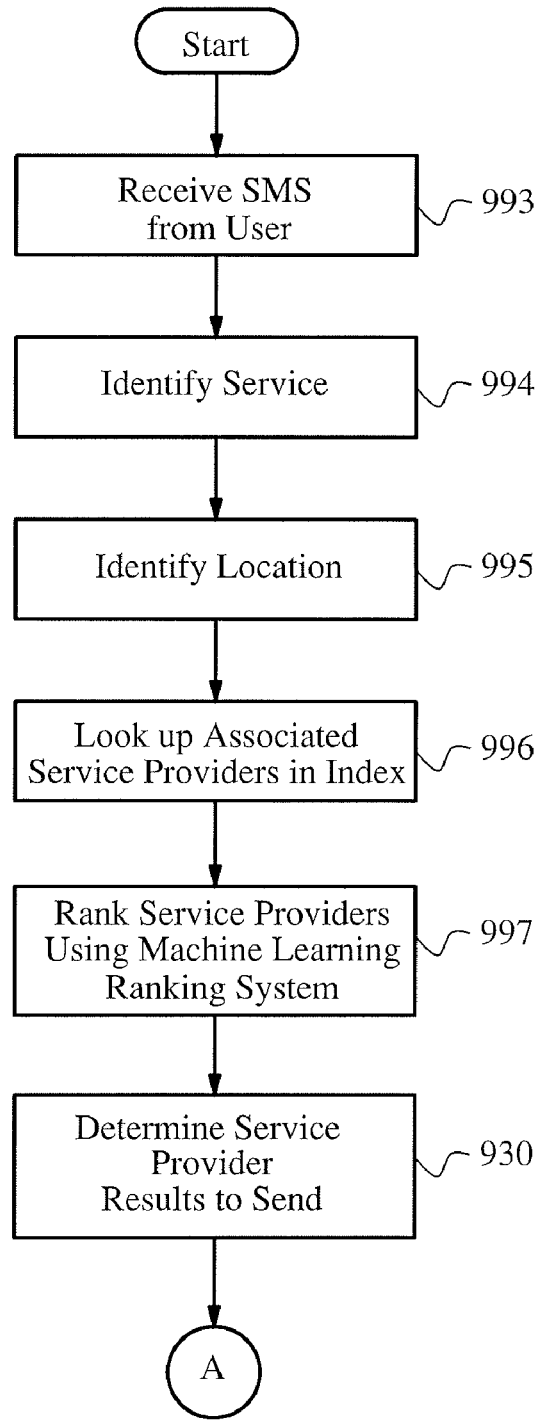
FIGS. 9A and 9B shows a flowchart of an embodiment of the process of FIG. 7.
Figure 9B:
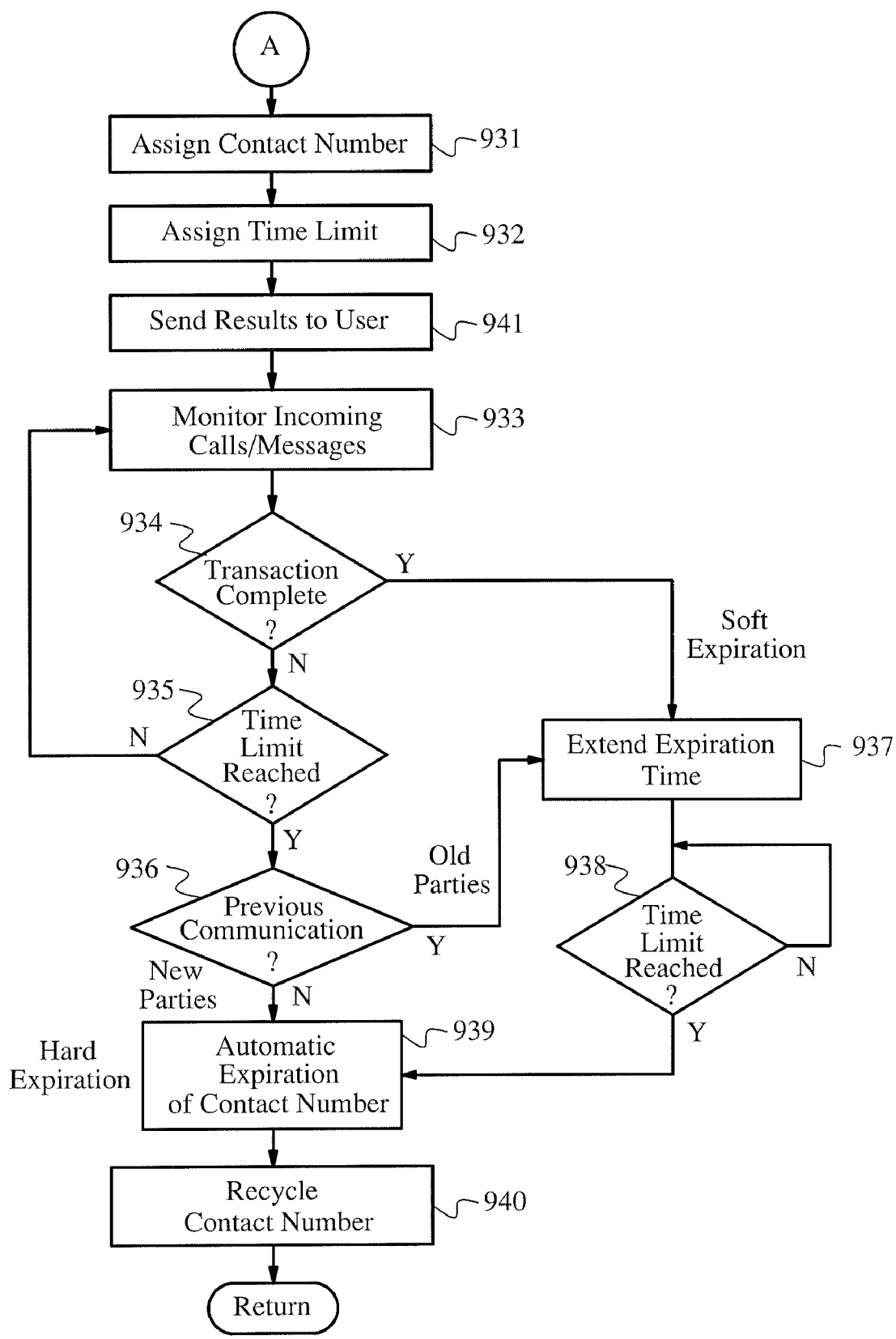

FIGS. 9A-9B illustrates an embodiment of process 900, which may be employed by an embodiment of process 700 of FIG. 7.

After a start block, the process moves to block 993, where an SMS message is received from a user.

In some embodiments, only an SMS message sent from a user to the service exchange is received and used to retrieve search results. For example, there may be a particular common short code (CSC) for this purpose, and a user wishing to use the search portal service sends an SMS, such as SMS 898, to the common short code.

In other embodiment, the service exchange may also receive some SMS messages sent from one user to another. For example, in one embodiment the service exchange has agreements with mobile service providers and the value of impression or conversion of the advertisement paid by the advertiser will be distributed among service exchange and mobile service provider, or for some constant amount. In this embodiment, the service exchange acts as exchange for all registered mobile service providers and customers (users who use mobile phones). Some users may be registered with the service for providing "advertisements" in the form of search results for SMS messages sent to and from the user. In some embodiments, such participating users are paid for registering to provide such advertisements. When sending a message from one user to another, where at least one of the users is registered, the SMS (or other text message) may proceed as follows:

1. User U1 sends SMS/MMS/text message to User U2.
2. This message goes through gateways of both the mobile service providers of U1 and U2 before reaching U2; let S1 and S2 represent service providers for U1 and U2 respectively.
3. The service exchange, if partnered with either U1 or U2, can modify the message to include the advertisement.
4. If the service exchange is partnered with S1, S1 forwards the SMS received from U1 to the service exchange, which will then modify the message and sends back to S1, for S1 to send the message, now modified by including the added search results.

In either case, whether the user is sending an SMS to the service exchange, or a user is sending an SMS to another user, which is first received by the service exchange, the SMS is received by the service exchange in step 993.

The process then advances to block 994, where a service associated with the SMS is identified. Determining the service is generally simpler in the case of an SMS sent to the service exchange, in which case the SMS is sent for the purpose of requesting a particular service. For example, for SMS message 898, "gas agency" would be the identified service. In the case of an SMS sent from one user to another, a service relevant to the content of the SMS message is determined. For example, if an SMS message "lunch today?" is sent to another user, the determined content could be lunch and/or restaurant (and the determined results, of step 997, could be restaurants that serve lunch that are near the users). In either case, the service may be identified based on information retrieval, machine learning algorithms, and/or the like.

The process then moves to block 995, where a location is determined. For example, for SMS message 898, "indranagar" would be the identified location. As with identifying the service, identifying the location may be determined based on information retrieval, machine learning algorithms, and/or the like. If no location is provided in the SMS, then in some embodiments, the actual location of the user is used, determined based on either GPS location or determined approximately by the mobile service provider based on the towers. In the case of an SMS sent from one user to another, where no location is mentioned or the service exchange could not decrypt the location, both locations are identified (and ranking of results in step 997 would include locations of both users in ranked order).

For step 994 and/or step 995, if there is ambiguity in the service or location, disambiguation can be done based on features like user's interests, time of the day, and/dr the like. If the disambiguation system's confidence is low, all services or locations are identified (with ranking of results in step 997 being grouped/ranked based on service or location). Also, in some embodiments, feedback from user can be sought implicitly/explicitly through his interactions with the service exchange; explicitly by asking the user to send a SMS/click some part of request for more results regarding the service/location and implicitly by tracking user's conversations for some time interval and providing him/her with more results on the user's behavior in the time interval.

After step 995, the process proceeds to block 996, where service providers associated with the identified service and location are looked up in the service provider index.

The process then advances to block 997, where service providers are ranked by relevancy using a machine learning algorithm. The machine learning algorithm may be trained offline, for example, trained using editorially annotated data or obtained through an automatic approach. Techniques such as natural language processing and information retrieval may be used. Relevancy ranking may be based on factors based on exact distance between the user and the service provider, time of day, demographic and/or psychographic information of the user such as age and gender of the user, educational background, and/or work profile. Also, the number of successful transactions that a service provider has had in the past may increase the service provider's relevancy rank in relevant searches. Additionally, behavioral targeting may be used in the ranking; behavior can be analyzed based on the previous requests from the user and these set of features identify user interests based on history and can be used to satisfy the current request. Information Retrieval and Machine Learning algorithms are used to perform this. In general, the machine learning algorithm is used to perform an intent-based search rather than a blind search. Various existing known technologies used in search engines for generating relevant results, and in computational advertisements for matching advertisements, may also be used for the relevancy ranking.

The process then advances to step 930, where a determination is made as to which service provider results to send to the user. The top X results are sent. In some embodiments, either two or three results are sent, depending on how many will fit within a single SMS message.

The process then moves to block 931, where a contact number is assigned for each service provider result that is to be sent to the user, for the user to use in contacting that service provider. The process then proceeds to block 932, where a time limit (or expiration time) for the number is assigned based on a number of possible factors, including but not limited to the type of service advertised, the commission paid by the service provider, the lifetime of the customer need, time limitations on the business deal itself, etc. For example, if a customer needs to see a dentist in the next two hours, assigning a dynamic contact number with a lifetime much longer than two hours will not serve the purpose. Similarly, if a customer needs a ticket for a show in the evening, assigning a dynamic contact number with a lifetime past the present date will not serve the purpose.

The process then moves to block 941, where the results are sent to the user, including, for each result provided, the name of each service provider, the obfuscated contact number for contacting the service provider, and possibly other information regarding the service provider, such as a description of the service provider, general location of the service provider, price category of the service provider, and/or the like. In some embodiments, the results are provided in order of their ranking, with the most relevant result listed first, etc. In the case of an SMS sent form one user to another, in one embodiment, the SMS is sent to the other user with the results added to end of the SMS. The process then advances to block 933 where the progress of a transaction between the parties is monitored (by tracking and recording calls and/or messages exchanged between the user and the service provider). Various items of information (the "context" of the transaction) are extracted and stored in the number database (e.g. number database 479 of FIG. 4). A call made by the user to the service provider is directed to the service exchange, which then routes the call to the service provider using the service provider's stored contact information.

The dynamic contact number expires at the end of the assigned time limit; however, there may be situations in which the parties are still actively working on concluding a transaction. If a transaction is not complete (step 934), but the assigned time limit is reached (step 935), the service exchange determines whether the parties have already communicated with the service exchange using the contact number before expiration (step 936). If the parties are "Old Parties," meaning that they have previously communicated, the expiration of the contact number is treated as a "soft" expiration, and the lifetime of the contact number is extended (step 937). In an embodiment, when a transaction completes successfully the expiration of the dynamic contact number is treated as a soft expiration by default.

Soft expiration will become hard expiration, even for old parties (step 938), after a sufficient amount of time dictated by various factors as described above. If the parties are "New Parties" and have not communicated during the lifetime of the contact number, the number expires automatically (step 939), and the new parties cannot communicate with the expired contact number. After some convenient interval of time, the assigned number(s) are recycled; that is, assigned to a new user for a different transaction (step 940). The assigned number(s) may be recycled automatically in some embodiments. The process then proceeds to a return block, where other processing is resumed.

Figure 10:
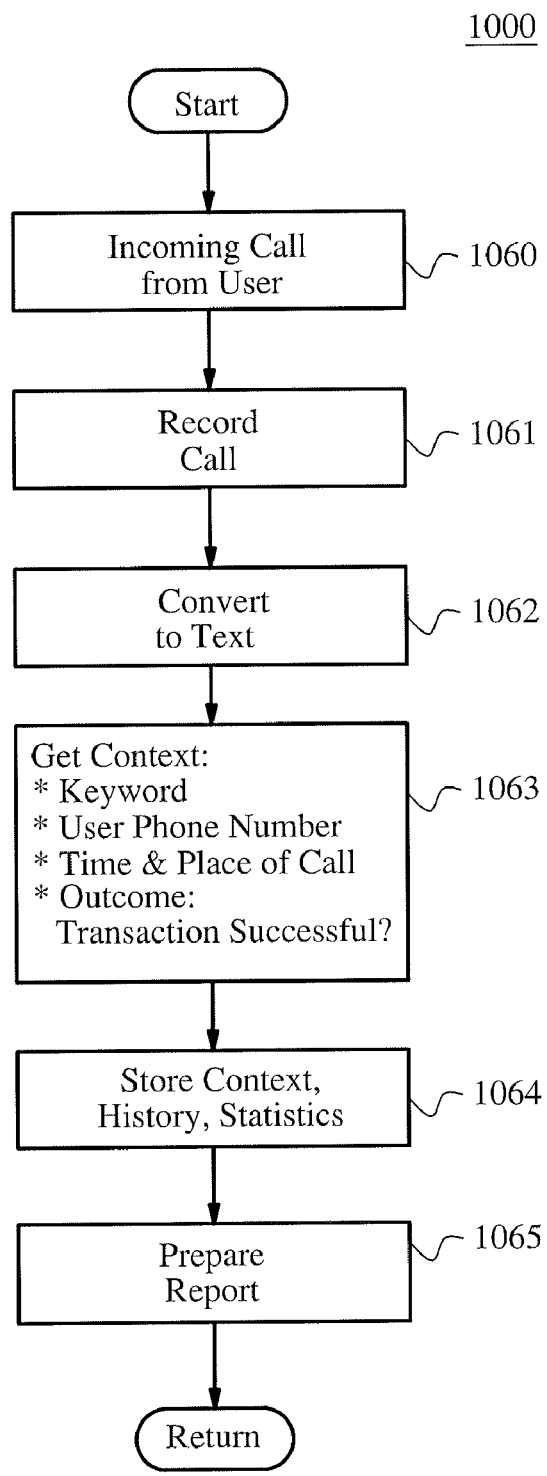
FIG. 10 shows a flowchart of an embodiment of yet another process, in accordance with aspects of the present invention.

FIG. 10 illustrates an embodiment of process 1000, which may be employed by an embodiment of service exchange 106 of FIG. 1. Process 1000 is an embodiment of a procedure for extracting information from the user/service provider transaction.

After a start block, the process proceeds to block 1060, wherein an incoming call is received from a user. The process then advances to block 1061, where the incoming call from the user is recorded. The process then moves to block 1062, where the content of the call is converted to text using a speech/text algorithm. (Alternatively, the content of an incoming text message is recorded as text by the service exchange.)

The process then proceeds to block 1063, where the text is then mined for the context of the transaction: for example, the advertising keyword used to elicit the user's query, the user's phone number, the time and place of the user's call, and the outcome of the transaction (whether or not it was successful). The process then moves to block 1064, where this information is stored along with all other information from tracking the transaction. The content of the call may be analyzed, for example, for additional leads. The service exchange may then charge the advertiser for each lead, or per successful lead. Additional data regarding the transaction is stored and analyzed. The process then advances to block 1065, where the information is then analyzed and reported to the service provider as an additional paid service. The process then proceeds to a return block, where other processing is resumed.

The above specification, examples, and data provide a complete description of the manufacture and use of the composition of the invention. Since many embodiments of the invention can be made without departing from the spirit and scope of the invention, the invention also resides in the claims hereinafter appended.

What is claimed is:

1. A method for providing information, comprising:
  determining a service related to content in a messaging service message sent by a user;
  ranking service providers for the determined service based on at least relevancy to the determined service, wherein the relevancy is determined based on a machine learning ranking system, and wherein factors for determining the relevancy include a location of the service provider, the age of the user, the gender of the user, a quantity of transactions successfully completed by the service provider, and a user location, wherein the user location is a user-requested location if the user requested a location, and wherein the user location is the user's current location otherwise;
  determining one or more top-ranked service providers to provide to the customer, based on the determined service, wherein the determination is accomplished by a processor employing processor-executable code;
  for each of the determined one or more top-ranked results, dynamically assigning an associated obfuscated phone number for phone interactions between the user and the service provider of the result; and providing the determined one or more of the top ranked results of service providers to the customer, including, for each of the provided results, a name of the service provider, and the associated obfuscated phone number.

2. The method of claim 1, wherein
  the messaging service message is a short messaging service (SMS) message, a multimedia messaging service (MMS) message, or an instant message (IM) message.

3. The method of claim 1, wherein the messaging service message is an SMS message.

4. The method of claim 1, wherein
  the relevancy includes distance between a current location of the user and a location of the service provider.

5. The method of claim 1, wherein the messaging service message is a search request for the service related to the content in the parsed messaging service message.

6. The method of claim 1, wherein the messaging service message is a personal messaging service method sent from the user to another user.

7. The method of claim 1, wherein determining the associated obfuscated phone number includes:
  dynamically assigning an obfuscated phone number for the user to contact the service provider, wherein the associated obfuscated phone number is different from a true contact number for the service provider;
  assigning an expiration time for the associated obfuscated contact number;
  storing an association between the obfuscated contact number for the service provider, the true contact number of the contact provider, the user, and the expiration time;
  connecting between the user and the service provider using the true contact number of the service provider when the user uses the associated obfuscated contact number so that the user may contact the service provider by phone using the associated obfuscated phone number such that true contact information of the user is not disclosed to the service provider and true contact information of the service provider is not disclosed to the user; and
  causing an expiration of the associated obfuscated contact number in an absence of communication between the user and the service provider before the expiration time.

8. The method of claim 1, further comprising:
  recording calls made by the user to the service provider using the associated obfuscated contact number;
  converting the recorded call to text;
  employing a machine-learning algorithm to determine results of the call, including whether the transaction between the user and the service provider was successful during the call; and
  charging a commission to the service provider based on an advertising model that was pre-selected by the service provider based on the results of the call determined by the machine-learning algorithm.

9. A network device, comprising:
  a transceiver for receiving and sending information; and
  a search portal device that is arranged to, in conjunction with the transceiver, enable actions, comprising:
    determining a service related to content in a messaging service message sent by a user;

ranking service providers for the determined service based on at least; relevancy to the determined service, wherein the relevancy is determined based on a machine learning ranking system, and wherein factors for determining the relevancy include a location of the service provider, the age of the user, the gender of the user, a quantity of transactions successfully completed by the service provider, and a user location, wherein the user location is a user-requested location if the user requested a location, and wherein the user location is the user's current location otherwise;

determining one or more top-ranked service providers to provide to the customer based on the determined service;

for each of the determined one or more top-ranked results, dynamically assigning an associated obfuscated phone number for phone interactions between the user and the service provider of the result; and providing the determined one or more of the top ranked results of service providers to the customer, including, for each of the provided results, a name of the service provider, and the associated obfuscated phone number.

10. The network device of claim 9, wherein
the search portal device is further arranged such that the relevancy includes distance between a current location of the user and a location of the service provider.

11. The network device of claim 9, wherein the search portal device is further arranged such that determining the associated obfuscated phone number includes:

dynamically assigning an obfuscated phone number for the user to contact the service provider, wherein the associated obfuscated phone number is different from a true contact number for the service provider;

assigning an expiration time for the associated obfuscated contact number;

storing an association between the obfuscated contact number for the service provider, the true contact number of the contact provider, the user, and the expiration time;

connecting between the user and the service provider using the true contact number of the service provider when the user uses the associated obfuscated contact number so that the user may contact the service provider by phone using the associated obfuscated phone number such that true contact information of the user is not disclosed to the service provider and true contact information of the service provider is not disclosed to the user; and causing an expiration of the associated obfuscated contact number in an absence of communication between the user and the service provider before the expiration time.

12. The network device of claim 9, where the search portal device is arranged to enable further actions in conjunction with the transceiver, including:

recording calls made by the user to the service provider using the associated obfuscated contact number;

converting the recorded call to text;

employing a machine-learning algorithm to determine results of the call, including whether the transaction between the user and the service provider was successful during the call; and charging a commission to the service provider based on an advertising model that was pre-selected by the service provider based on the results of the call determined by the machine-learning algorithm.

13. A system for providing information, comprising:
a user mobile network device that is arranged to send and receive messaging service messages;

a plurality of service providers; a service exchange network device that is arranged to perform actions, including:

determining a service related to content in a messaging service message sent by user mobile network device;

ranking the service providers for the determined service based on at least relevancy to the determined service, wherein the relevancy is determined based on a machine learning ranking system, and wherein factors for determining the relevancy include a location of the service provider, the age of the user, the gender of the user, a quantity of transactions successfully completed by the service provider, and a user location, wherein the user location is a user-requested location if the user requested a location, and wherein the user location is the user's current location otherwise;

determining one or more top ranked service providers to provide to the customer based on the determined service;

for each of the determined one or more top-ranked results, dynamically assigning an associated obfuscated phone number for phone interactions between the user and the service provider of the result; and providing the determined one or more of the top ranked results of service providers to the customer, including, for each of the provided results, a name of the service provider, and the associated obfuscated phone number.

14. The system of claim 13, wherein
the service exchange network device is further arranged such that the relevancy includes distance between a current location of the user and a location of the service provider.

15. An article of manufacture including non-transitory processor-readable medium having processor-executable code stored therein, which when executed by one or more processors, enables actions for providing information, comprising:

determining a service related to content in an messaging service message, sent by a user;

ranking service providers for the determined service based on at least relevancy to the determined service, wherein the relevancy is determined based on a machine learning ranking system, and wherein factors for determining the relevancy include a location of the service provider, the age of the user, the gender of the user, a quantity of transactions successfully completed by the service provider, and a user location, wherein the user location is a user-requested location if the user requested a location, and wherein the user location is the user's current location otherwise;

determining one or more top ranked service providers to provide, to the customer based on the determined service;

for each of the determined one or more top-ranked results, dynamically assigning an associated obfuscated phone number for phone interactions between the user and the service provider of the result; and providing the determined one or more of the top ranked results of service providers to the customer, including, for each of the provided results, a name of the service provider, and the associated obfuscated phone number.

16. The article of manufacture of claim 15, wherein the relevancy includes distance between a current location of the user and a location of the service provider.

17. The article of manufacture of claim 15, wherein:

determining the associated obfuscated phone number includes:

dynamically assigning an obfuscated phone number for the user to contact the service provider, wherein the associated obfuscated phone number is different from a true contact number for the service provider;

assigning an expiration time for the associated obfuscated contact number;

storing an association between the obfuscated contact number for the service provider, the true contact number of the contact provider, the user, and the expiration time;

connecting between the user and the service provider using the true contact number of the service provider when the user uses the associated obfuscated contact number so that the user may contact the service provider by phone using the associated obfuscated phone number such that true contact information of the user is not disclosed to the service provider and true contact information of the service provider is not disclosed to the user; and causing an expiration of the associated obfuscated contact number in an absence of communication between the user and the service provider before the expiration time.

* * * * *